(12) United States Patent
Fredriksson et al.

(10) Patent No.: US 11,965,767 B2
(45) Date of Patent: Apr. 23, 2024

(54) HYGIENIC TANK SEAL

(71) Applicant: ROSEMOUNT TANK RADAR AB, Mölnlycke (SE)

(72) Inventors: Håkan Fredriksson, Linköping (SE); Björn Lindblad, Gothenburg (SE); Mikael Eriksson, Västervik (SE)

(73) Assignee: ROSEMOUNT TANK RADAR AB, Mölnlycke (SE)

( * ) Notice: Subject to any disclaimer, the term of this patent is extended or adjusted under 35 U.S.C. 154(b) by 389 days.

(21) Appl. No.: 17/604,534

(22) PCT Filed: Apr. 23, 2019

(86) PCT No.: PCT/EP2019/060375
§ 371 (c)(1),
(2) Date: Oct. 18, 2021

(87) PCT Pub. No.: WO2020/216436
PCT Pub. Date: Oct. 29, 2020

(65) Prior Publication Data
US 2022/0196453 A1  Jun. 23, 2022

(51) Int. Cl.
*G01F 23/284* (2006.01)
*F16L 23/00* (2006.01)
(Continued)

(52) U.S. Cl.
CPC ......... *G01F 23/284* (2013.01); *F16L 23/003* (2013.01); *F16L 23/08* (2013.01);
(Continued)

(58) Field of Classification Search
CPC ......... F16L 23/003; F16L 23/08; F16L 23/12; F16L 23/22; F16L 41/008; G01F 23/284; G01S 13/34; G01S 13/88
See application file for complete search history.

(56) References Cited

U.S. PATENT DOCUMENTS 6,386,055 B1   5/2002  Eason
6,658,932 B2 * 12/2003  Munley ................. G01F 23/284
                                                    333/252
(Continued)

OTHER PUBLICATIONS

European International Search Report and Written Opinion for International Application No. PCT/ EP2019/060375, dated Feb. 14, 2020, 15 pages.

*Primary Examiner* — Timothy A Brainard
(74) *Attorney, Agent, or Firm* — Westman, Champlin & Koehler, P.A.

(57) ABSTRACT

A guided wave radar level gauge adapted for mounting on a nozzle of a tank, including an attachment collar with an opening configured to be aligned with the nozzle and to be secured by means of an annular clamping device, and a transmission line probe attached to an exterior end of a probe connector. The GWR level gauge further comprises an annular sealing gasket fitted in the collar opening, the annular sealing gasket having a central opening through which the central probe connector extends, and a distancing sleeve arranged around the exterior end of the probe connector and having a radially protruding collar portion, wherein processing circuitry is configured to detect an impedance change caused by tank content or condensate which has passed through the central opening of the sealing gasket and collected in an annular space immediately surrounding the radially protruding collar portion.

6 Claims, 3 Drawing Sheets

(51) Int. Cl.
*F16L 23/08* (2006.01)
*F16L 23/22* (2006.01)
*F16L 41/00* (2006.01)
*G01S 13/88* (2006.01)

(52) U.S. Cl.
CPC ............ *F16L 23/22* (2013.01); *F16L 41/008* (2013.01); *G01S 13/88* (2013.01)

(56) References Cited

U.S. PATENT DOCUMENTS

| | | | |
|---|---|---|---|
| 7,134,315 B1* | 11/2006 | Stigler | H01Q 1/225 73/290 R |
| 9,217,659 B2 | 12/2015 | Janitch | |
| 2003/0030517 A1 | 2/2003 | Munley et al. | |
| 2007/0084281 A1 | 4/2007 | Fredriksson | |
| 2007/0188396 A1* | 8/2007 | Griessbaum | G01S 7/03 343/786 |
| 2010/0123615 A1* | 5/2010 | Fehrenbach | H01Q 19/08 342/124 |
| 2014/0103950 A1 | 4/2014 | Janitch | |
| 2014/0109699 A1* | 4/2014 | Janitch | G01D 11/30 73/866.5 |
| 2014/0125512 A1 | 5/2014 | Janitch | |
| 2016/0187179 A1 | 6/2016 | Hrncir et al. | |
| 2017/0227392 A1* | 8/2017 | Rivera | G01N 33/00 |
| 2017/0268922 A1 | 9/2017 | Heath et al. | |
| 2020/0003603 A1* | 1/2020 | Uddh | G01S 13/08 |
| 2020/0116543 A1* | 4/2020 | Fredriksson | G01S 13/88 |

* cited by examiner

HYGIENIC TANK SEAL

CROSS-REFERENCE TO RELATED APPLICATION

This Application is a Section 371 National Stage Application of International Application No. PCT/EP2019/060375, filed on Apr. 23, 2019, and published as WO 2020/216436 A1 on Oct. 29, 2020, in English, the entire contents of which are hereby incorporated by reference in their entireties.

FIELD OF THE INVENTION

The present invention relates to guided wave radar (GWR) level gauge mounted to a tank nozzle by means of a hygienic tank seal. The tank seal may include a tri-clamp (also referred to as tri-clover).

BACKGROUND OF THE INVENTION

A radar level gauge (RLG) is suitably used for making measurements of a filling level of products such as process fluids, granular compounds and other materials contained in a tank, e.g. process tanks. In some applications, it is required to provide satisfactory sealing of the tank on which the RLG is mounted. Such sealing is typically referred to as a "process seal". The process seal can be provided by an annular sealing element, sometimes referred to as a gasket, sandwiched between the instrument and an annular opening on which the instrument is mounted (e.g. a tank nozzle).

In some cases, the RLG is mounted to a tank nozzle by means of an annular coupling device, such as a tri-clamp. U.S. Pat. No. 6,658,932 discloses a non-contact (free propagating) radar level gauge mounted with a tri-clamp, where a PTFE process seal is fitted between the tank opening and the gauge housing. The PTFE process seal is transmissive to the radar signals.

Although not commercially available, it is desirable to also provide guided wave radar level gauges that can be mounted and sealed in a similar fashion. A guided wave radar (GWR) level gauge includes a transmission line probe extending from the gauge to the bottom of the tank. In use, electromagnetic signals are guided along the probe and are reflected by an impedance transition caused by the product surface.

In the case of a GWR level gauge, the sealing gasket mentioned above needs to be annular, with a central opening though which the transmission line probe of the level gauge can pass.

In some applications, such as in the food industry, any equipment that is brought into contact with the process needs to comply with health regulations, such as EHEDG (European Hygienic Engineering & Design Group). One requirement is that any leakage past the tank seal must be visible on the outside, to enable detection and a replacement of the gasket. There is a steady effort to find improved solutions for such leakage detection.

GENERAL DISCLOSURE OF THE INVENTION

It is an object of the present invention to provide a hygienic process seal for a guided wave radar level gauge with improved leakage detection.

This and other objects are achieved by a guided wave radar level gauge for determining the filling level of product in a tank, the level gauge being adapted for mounting on a nozzle of a tank, the level gauge comprising transceiver circuitry configured to generate and transmit an electromagnetic transmit signal $S_T$ and receive an electromagnetic return signal $S_R$ from the tank, the electromagnetic return signal caused by a reflection from a surface of the product, a transmission line probe electrically connected to the transceiver circuitry, the probe in use extending from the level gauge to a bottom of the tank, and being adapted to allow the microwave transmit signal to propagate along the probe toward the product and return the electromagnetic return signal, processing circuitry configured to determine the distance between a reference position and the surface of the product based on a relationship between the transmit signal and the return signal, an attachment collar with an opening configured to be aligned with the nozzle and to be secured by means of an annular clamping device, and a coaxial probe connection comprising a central probe connector suspended in a dielectric sleeve mechanically secured in the attachment collar, the central probe connector having an exterior end extending outside the dielectric sleeve beyond the collar opening, wherein the probe is attached to the exterior end of the probe connector. The GWR level gauge further comprises an annular sealing gasket fitted in the collar opening, the annular sealing gasket having an outer periphery configured to be sandwiched between the attachment collar and a flange of the nozzle, and a central opening through which the central probe connector extends, and a distancing sleeve arranged around the exterior end of the probe connector, the distancing sleeve having a radially protruding collar portion between the dielectric sleeve and the sealing gasket, such that, when the probe is attached to the probe connector, an inner periphery of the sealing gasket will be sandwiched between the axially protruding collar portion and an end of the probe, wherein the processing circuitry is configured to detect an impedance change caused by tank content or condensate which has passed through the central opening of the sealing gasket and collected in an annular space immediately surrounding the radially protruding collar portion.

The invention is based on the realization that when a GWR level gauge is mounted with a hygienic to a tank nozzle (e.g. by means of a tri-clamp), an additional potential point of leakage (along the probe) is created. If detected, an "inner" leakage along the probe may be used as an "early warning", i.e. an indication that the process seal may need replacement. Unfortunately, this "inner" point of leakage is not easily accessible from the outside. However, any presence of an electrically conducting fluid, such as liquid tank content or condensate, will cause a decrease of the impedance which may be detected by analyzing the received radar signals. Any leakage through the central opening of the gasket can thus be reliably detected.

The general principle to detect leakage along the probe of a GWR level gauge by detecting an interference of the microwave signals, is known per se, see e.g. U.S. Pat. No. 9,217,659. However, the level gauge in U.S. Pat. No. 9,217,659 is significantly different in design, and the leakage detection has a completely different purpose than the present invention. Specifically, there is no hint in U.S. Pat. No. 9,217,659 to use the proposed leakage detection as an early warning of a defect sealing gasket of a hygienic seal.

The annular clamp may be a tri-clamp, but may alternatively be some other type of annular clamping device which is configured to secure the attachment collar to the nozzle flange.

In one embodiment, the attachment collar includes an annular sealing surface, an annular abutment surface located radially outside the sealing surface and configured to abut an outer periphery of the tank nozzle, and a ridge located radially outside the abutment surface. With this design, when the gauging instrument is mounted on a tri-clamp flange of a tank nozzle, the ridge surrounds the outer periphery of the tri-clamp flange to thereby ensure radial alignment, the annular abutment surface abuts the periphery of the tank nozzle to ensure a precisely defined axial relation, and the sealing gasket is sandwiched between the sealing surface and the tri-clamp flange.

With his design, alignment and sealing are accomplished without the need of a Combifit® ring, leading to a more cost-efficient mounting. Also, such a design provides an improved tolerance chain in the axial direction compared to the conventional Combifit® ring, as the axial position is only determined by the axial distance between the sealing surface and the abutment surface.

The nozzle flange may be provided with an annular groove facing away from the tank, and the sealing gasket may comprise an annular protrusion configured to be received in this groove. Such a groove typically forms part of a tri-clamp type connection. By protruding into the groove, the gasket can provide an improved sealing performance.

The sealing gasket is preferably made a of a soft sealing material with adequate hygienic properties, such as rubber or a softened plastic, e.g. PTFE. Such materials typically have a thermal expansion which is greater than metal. For this reason, a gap may be formed radially outside the sealing gasket (between the gasket and the surrounding wall of the attachment collar), to allow for thermal expansion of the gasket without impairing the sealing function.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Embodiments of the present invention will herein be described with reference to a radar level gauge. However, it will be understood that the invention will be equally applicable also for other gauging instruments where an attachment collar is sealingly mounted on a tank nozzle by means of a clamping device. For example, the invention may be implemented in pressure gauges and ultrasonic gauges.

Figure 1:
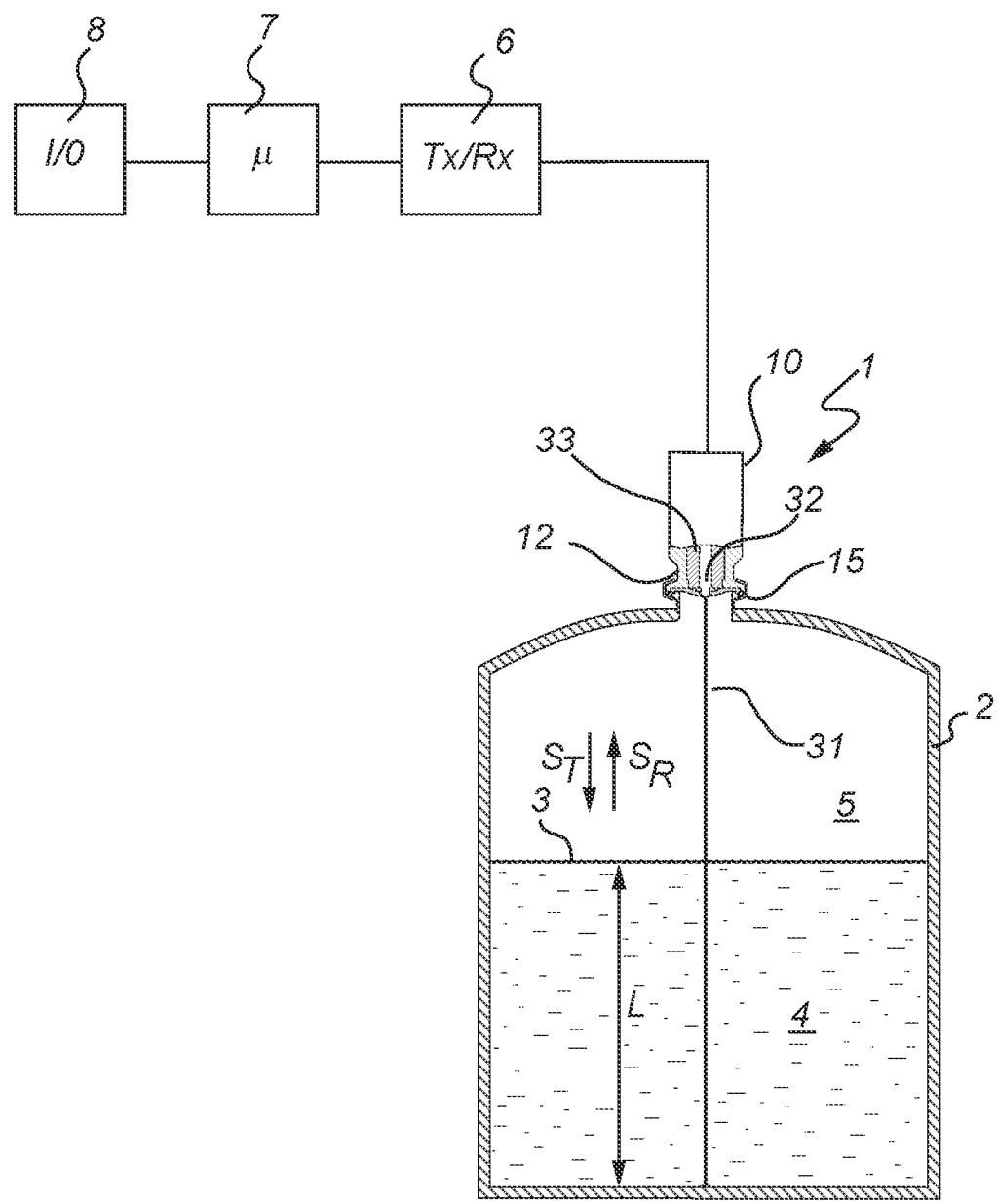
FIG. 1 is a schematic view of a guided wave radar level gauge according to a second embodiment of the invention.

A radar level gauge (RLG) 1 according to an embodiment of the present invention is illustrated schematically in FIG. 1. The RLG 1 is here mounted on a hygienic tank 2, and arranged to perform measurements of a process variable such as the level L of an interface between two materials in the tank 2. Typically, the first material is a product 4 stored in the tank, e.g. a liquid such as milk, or a solid such as a granular compound, the second material is air or other atmosphere 5 in the tank, while the interface is the surface 3 of the product 4. In some applications, the tank is a very large metal tank (diameter in the order of ten meters).

The RLG 1 circuitry includes transceiver circuitry 6, processing circuitry 7 and an interface 8.

The transceiver circuitry 6 is configured to generate and transmit an electromagnetic (microwave) transmit signal $S_T$ and receive an electromagnetic (microwave) return signal $S_R$. The transmit signals $S_T$ are propagated towards the surface 3 of the product 4 by a signal propagation device; here a guided wave probe 31 (see more details below). The electromagnetic return signals $S_R$ are caused by a reflection in the surface 3, and are returned by the signal propagation device and fed back to the transceiver 6. The transceiver circuitry 6 may be one functional unit capable of transmitting and receiving electromagnetic signals, or may be a system comprising separate transmitter and receiver units. The elements of the transceiver circuitry 6 are typically implemented in hardware, and form part of an integrated unit normally referred to as a microwave unit. For simplicity, the transceiver circuitry is referred to as the "transceiver" in the following description.

The processing circuitry 7 may include a combination of analogue processing embodied in hardware, and digital processing embodied by software modules stored in a memory and executed by an embedded processor. The invention is not restricted to the particular realization, and any implementation found suitable to realize the herein described functionality may be contemplated.

The processing circuitry 7 is configured to determine the distance between a reference position at the top of the tank (such as the passage between the outside and the inside of the tank) and the surface 3 by processing the transmit signal $S_T$ and the return signal $S_R$. The processing typically includes generation of a tank signal or "echo curve", including a plurality of peaks representing echoes from the interior of said tank. One of the peaks represent an echo from the surface 3. Based on the determined distance to the surface 3, generally referred to as ullage, and known dimensions of the tank 2, a process variable such as the filling level L of the tank can be determined.

The interface 8 is configured to allow communication of a measurement value externally of the RLG and optionally for power supply of the RLG. For example, the interface 8 may be a two-wire control loop 9, such as a 4-20 mA loop. The interface 8 may also include a serial data bus, allowing communication using a digital communication protocol. Examples of available digital protocols include HART, Modbus, Profibus and Foundation Fieldbus. The interface 8 may also be a wireless interface, employing e.g. wireless HART, in which case the RLG is provided with some sort of internal energy store, such as a battery, possibly solar powered.

According to one measuring principle, the transmit signal is a continuous signal with varying frequency (frequency modulated continuous wave, FMCW). An FMCW based RLG will emit a radar sweep with gradually varying frequency, and mix the received signal with the original signal (homodyne mixing) to form a frequency domain tank signal. Typically, the operating frequency range of a FMCW radar is centered around 6 GHz or 26 GHz, with a band-width of one or several GHz.

According to another measurement principle, the transmit signal is a train of distinct pulses with a duration in the order of ns and a repetition frequency in the order of MHz. The return signal is sampled with the original pulse train in a sample and hold circuit in a process known as time domain reflectometry (TDR), thereby forming a time domain tank signal.

The transmit signal may also be some combination of FMCW and a pulsed signal. For example, a principle known as multiple frequency pulsed wave (MFPW) has been proposed.

The circuitry 6, 7, 8 is housed in a housing, sometimes referred to as a measurement unit (MU) 10. The measurement unit (MU) 10 is mounted on a tank connection, here an annular attachment collar 12, made of a metal material, typically steel, which is adapted to be securely fitted with an annular clamping device 15, here a tri-clamp, to a nozzle 13 of the tank 2. The attachment collar 12 is adapted to provide a passage (preferably pressure sealed) for electromagnetic signals through the roof of the tank, which passage connects the transceiver circuitry 6 with a signal propagation device.

In FIG. 1, the RLG 1 is a guided waver radar (GWR), and the signal propagating device is a probe 31 extending from the RLG 1 to the bottom of the tank 2. The probe 31 can be e.g. a coaxial wire probe, a twin wire probe, or a single wire probe (also referred to as a surface wave guide). Electromagnetic waves transmitted along the probe 31 will be reflected by any interface 3 between materials in the tank, and the reflection will be transmitted back to the transceiver 6.

The probe 31 is attached to a coaxial probe connection comprising a central probe connector 32 suspended by a dielectric sleeve 33 arranged in a neck of the housing 10.

Figure 2:
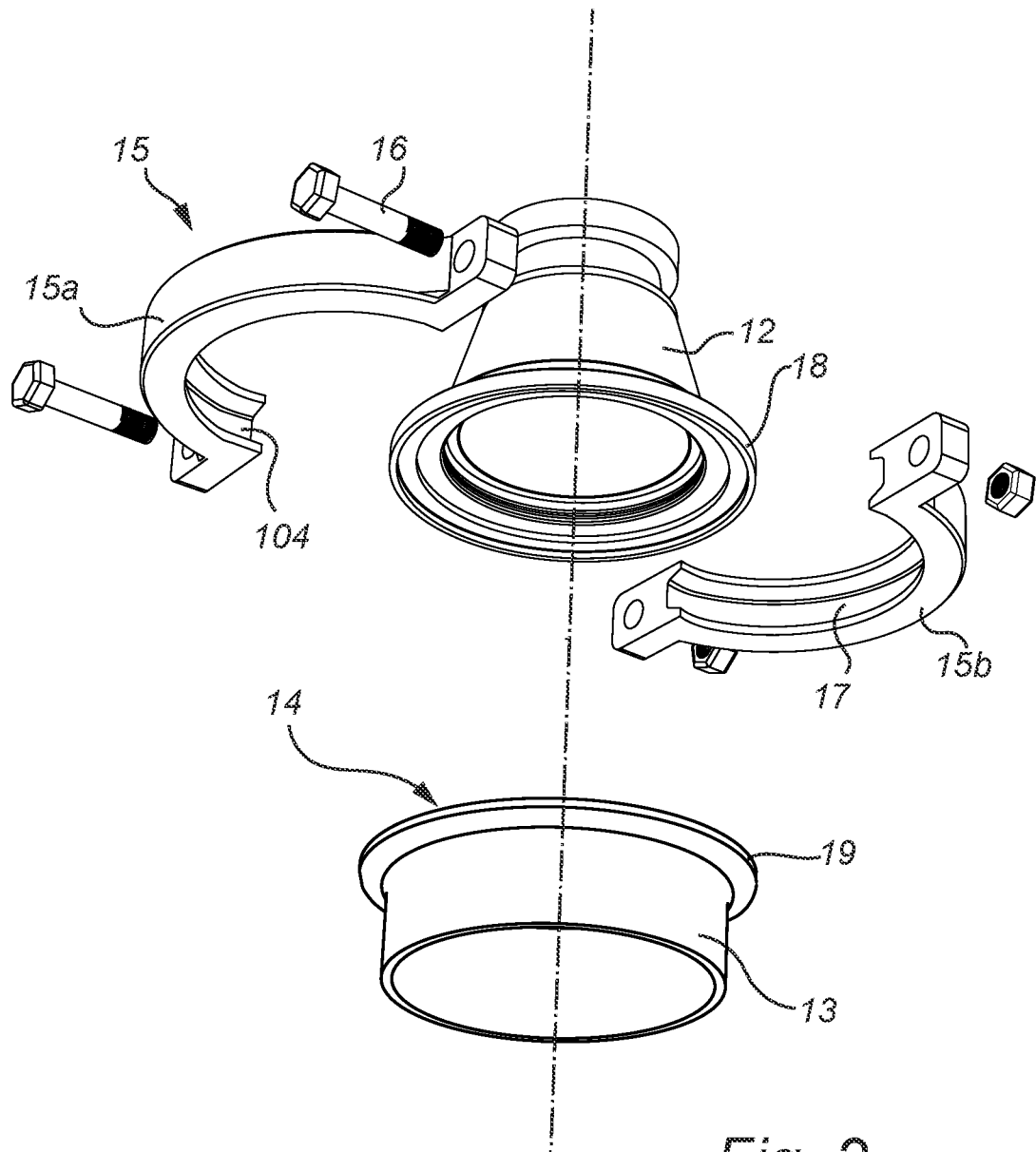
FIG. 2 is a perspective view of a tri-clamp mounting of a radar level gauge.

FIG. 2 shows in perspective view in more detail how the annular clamp 15 secures the RLG 1 to a tank nozzle 13 here with a tri-clamp type flange 14.

The annular clamp 15 here has two, substantially semi-circular elements 15a, 15b, which are held together by two bolts 16 acting in a tangential direction. In other examples the annular clamp is divided into more than two sections, e.g. three sections which together form the annular ring. Also, one or more of the sections may be joined by hinges instead of bolts. For example, the illustrated example, one of the bolts 16 may be replaced by a hinge.

A tapered groove 17 in the clamp elements 15a and 15b engages the outer rim 18 of the attachment collar 12 and the outer rim 19 of the tank nozzle 13. When the clamp 15 is secured by the tightening the bolts 16, the annular clamp 15 ensures a fixed position of the annular opening of the attachment collar 12 with respect to the annular opening of the tank nozzle 13. A sealing gasket (not shown in FIG. 2) is sandwiched between the rim 18 of the attachment collar 12 and the rim 19 of the nozzle 13. The gasket is made of a material approved for use in hygienic applications, such as rubber or a softened plastic, e.g. PTFE.

Figure 3:
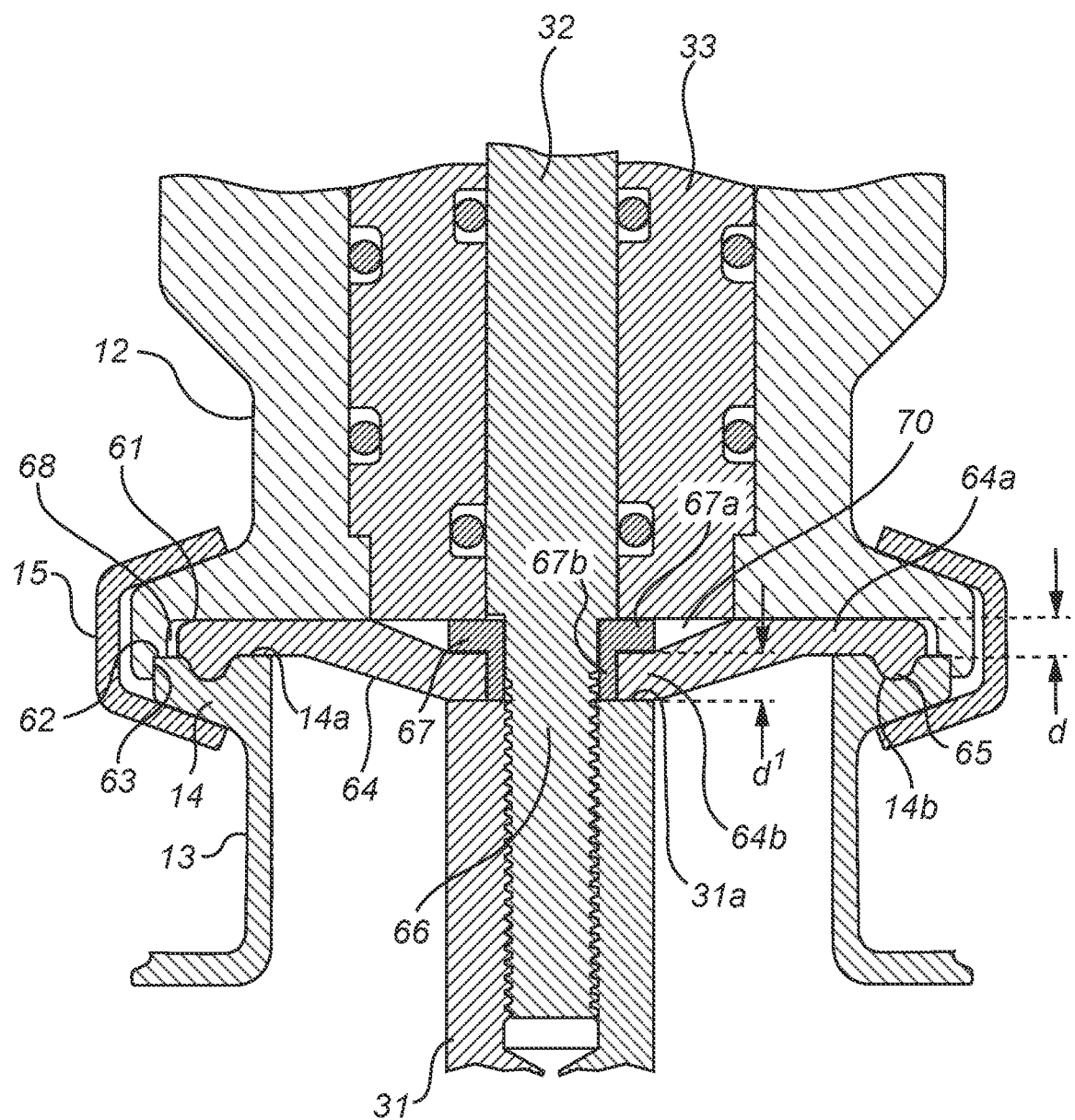
FIG. 3 is a cross section view of the tri-clamp mounting of the RLG in FIG. 1.

FIG. 3 shows, in more detail, the attachment of the non-contact RLG in FIG. 1, according to an embodiment of the present invention.

The attachment collar 12 of the RLG housing is formed with an annular sealing surface 61, surrounded by an annular abutment surface 62. Both the sealing surface 61 and the abutment surfaces 62 extend substantially in a plane normal to the axial direction A. The abutment surface 62 is axially displaced towards the nozzle 13, i.e. it is positioned axially distal with respect to the housing 10. When the attachment collar 12 is mounted on the nozzle 13, the abutment surface 62 will therefore be brought into contact with, and rest upon, the flange 14. This ensures a pre-determined axial distance d between the flange surface 14a and the sealing surface 61.

Radially outside the abutment surface 62, and surrounding it, is a ridge 63 extending axially towards the nozzle 13. The ridge 63 may be continuous, but may alternatively be formed of discrete portions. As the nozzle 12 abuts the abutment surface 62, the flange 14 is received within the ridge 63, so that the ridge 63 will surround the flange 14 and secure it in a radial position.

The outer perimeter 64a of a rubber gasket 64 is sandwiched between the surface 14a of the flange 14 and the sealing surface 61. The perimeter 64a of the gasket 64 has a thickness to ensure satisfactory sealing when it is compressed to the predetermined distance d. The gasket 64 further has an annular protrusion 65, formed to be received by the annular groove 14b in the tri-clamp flange 14.

In normal temperature, the gasket 64 has a diameter which is smaller than the area defined by the inner surface 12a of the attachment collar 12, illustrated in FIG. 3 by a gap 68. This allows for thermal expansion of the gasket 64 at elevated temperatures, without impairing the sealing.

The rubber gasket 64 is annular in shape, and is provided with a central opening 66 through which the central probe connector 32 is allowed to extend. A metal sleeve 67 is arranged around the central connector 32, on the RLG side of the gasket 64. The sleeve 67 has a base in the form of a radially protruding collar portion 67a making contact with the sleeve of the probe connection, and a neck portion 67b extending axially along the central connector 32. When the probe 31 is attached to the central connector 32 (typically by a threaded connection) the inner perimeter 64b of the gasket 64 is sandwiched between the collar portion 67a of the sleeve and the upper (RLG-facing) surface 31a of the probe 31. The neck portion 67b ensures a predefined distance d' between the surface 31a and the base 67a. The inner perimeter 64b of the gasket 64 has a thickness to ensure satisfactory sealing when it is compressed to the predetermined distance d'.

Due to the thickness of the collar portion 67a, the gasket 64 cannot not brought into contact with the lower surface of the dielectric sleeve 33 immediately adjacent to the collar portion 67a. Instead, an annular space 70 will be formed around the collar portion 67a. Any leakage of product or condensate from the tank interior past the central opening 66 of the gasket 64 will collect in this space 70.

In use, any conducting liquid collected in the space 70 will cause a decrease of the impedance, and electromagnetic signals propagated along the central conductor 32 thought the opening 66 will be affected by such a change in impedance. According to the invention, the processing circuitry 7 is configured to detect any such impedance change. The details of such determination can be realized by a person skilled in the art.

The person skilled in the art realizes that the present invention by no means is limited to the preferred embodiments described above. On the contrary, many modifications and variations are possible within the scope of the appended claims, which generally relate to the combination of a GWR with a hygienic process seal with an early warning leakage detection based on radar signal interference. For example, the details of the level detection may be different than those discussed above. Further, the physical design may be any type which is compatible with a GWR level gauge.

The invention claimed is:

1. A guided wave radar level gauge for determining the filling level of product in a tank, said level gauge being adapted for mounting on a nozzle of a tank, said level gauge comprising:

transceiver circuitry configured to generate and transmit an electromagnetic transmit signal $S_T$ and receive an electromagnetic return signal $S_R$ from the tank, the electromagnetic return signal caused by a reflection from a surface of said product, a transmission line probe electrically connected to said transceiver circuitry, said probe in use extending from the level gauge to a bottom of the tank, and being adapted to allow the microwave transmit signal to propagate along the probe toward said product and return the electromagnetic return signal, processing circuitry configured to determine the distance between a reference position and the surface of the product based on a relationship between the transmit signal and the return signal, an attachment collar with an opening configured to be aligned with the nozzle and to be secured by means of an annular clamping device, and a coaxial probe connection comprising a central probe connector suspended in a dielectric sleeve mechanically secured in the attachment collar, said central probe connector having an exterior end extending outside the dielectric sleeve beyond said collar opening, wherein said probe is attached to said exterior end of the probe connector, characterized by:

an annular sealing gasket fitted in said collar opening, said annular sealing gasket having an outer periphery configured to be sandwiched between the attachment collar and a flange of said nozzle, and a central opening through which said central probe connector extends, and a distancing sleeve arranged around the exterior end of the probe connector, said distancing sleeve having a radially protruding collar portion between the dielectric sleeve and the sealing gasket, such that, when the probe is attached to the probe connector, an inner periphery of the sealing gasket will be sandwiched between the radially protruding collar portion and an end of the probe, wherein said processing circuitry is configured to detect an impedance change caused by tank content or condensate which has passed through the central opening of the sealing gasket and collected in an annular space immediately surrounding said radially protruding collar portion.

2. The gauging instrument according to claim 1, wherein the annular clamp is a tri-clamp.

3. The level gauge according to claim 1, wherein the attachment collar includes:

an annular sealing surface, an annular abutment surface located radially outside said sealing surface and configured to abut an outer periphery of the tank nozzle, and a ridge located radially outside said abutment surface;

such that, when the gauging instrument is mounted on a tri-clamp flange of a tank nozzle, said ridge surrounds the outer periphery of the tri-clamp flange to thereby ensure radial alignment, said annular abutment surface abuts the periphery of the tank nozzle to ensure a precisely defined axial relation, and the sealing gasket is sandwiched between said sealing surface and the tri-clamp flange.

4. The gauging instrument according to claim 1, wherein the nozzle flange is provided with an annular groove, and wherein the sealing gasket comprises an annular protrusion configured to be received in said groove.

5. The gauging instrument according to claim 1, wherein the sealing gasket is made of rubber.

6. The gauging instrument according to claim 1, wherein a gap is formed radially outside the sealing gasket.

* * * * *